United States Patent Office 2,739,914
Patented Mar. 27, 1956

2,739,914

MANGANESE DIOXIDE DEPOLARIZER

Bernard R. Babbitt, Minneapolis, and Jay Y. Welsh, Brainard, Minn., assignors to Manganese Chemicals Corporation, Minneapolis, Minn., a corporation of Minnesota No Drawing. Application May 19, 1954,
Serial No. 430,974

3 Claims. (Cl. 136—139)

This invention relates to the production of a manganese dioxide depolarizer product. It is concerned with a procedure for improving the depolarizing properties of a high grade natural $MnO_2$-containing ore.

It heretofore has been proposed to extract manganese from reduced manganiferous ores by leaching the same with a strongly ammoniacal aqueous solution of an ammonium salt, e. g. with a strongly ammoniacal aqueous solution of ammonium carbamate; also, to precipitate manganese carbonate from the resulting manganese-containing solution and to convert the manganese carbonate to a battery-grade manganese dioxide product. These cumulative procedures have special significance and importance with regard to the production of manganese dioxide depolarizer from domestic ores containing relatively low concentrations of manganese in association with oxidic iron and gangue materials. They may, however, entail relatively expensive procedural steps contributing to the cost of the depolarizer product.

According to the present invention a high grade manganese dioxide ore, such as a Gold Coast ore, is improved as to its depolarizing properties by the following relatively inexpensive procedure: The ore is roasted under controlled reducing conditions so that its manganese content is in the form of manganous oxide and any oxidic iron present in the ore is all in the form of $Fe_3O_4$. The reduced ore is then added to, and steeped for an extended period which may amount to several hours in a strongly ammoniacal aqueous solution of ammonium carbamate. The exothermicity of the reaction between components of the reduced ore and components of the leaching solution tends to produce a magma of precipitated manganese carbonate—produced by leaching out of the manganese and prompt precipitation as carbonate—in and amongst the ore particles and this propensity to formation of a manganese carbonate precipitate is not combated but rather is favored, in so far as possible, by stirring and gently heating the slurry of ore particles and solution. Thereafter, the ammonia concentration of the liquid phase of the resulting solids-liquid slurry is materially reduced, as by heating to an elevated temperature of the order of 55–60° C. under conditions to disengage ammonia, thereby largely precipitating dissolved manganese, as manganese carbonate from the liquid phase, on and amongst the particles of leached or partially leached ore.

The resulting solid and liquid phases are then separated as by centrifuging or settling, and the so-separated solids mixture—composed of precipitated $MnCO_3$ in intimate association with particles of at least partially leached manganese ore—is washed, dried and finally is heated, in air, at an elevated temperature within the range 275°–400° C., to convert the manganese carbonate content thereof as completely as possible to manganese dioxide.

The separated liquid phase may be re-formed into leaching solution by suitable fortification with $NH_3$ and $CO_2$, and re-used in the treatment of a further quantity of reduced manganese ore.

The invention will now be explained in further detail in connection with the following specific example:

A Gold Coast ore, analyzing about 84% $MnO_2$ and about 2% $Fe_2O_3$, is crushed to ¾ inch and screened at 14 mesh. The minus 14 mesh fraction is washed to remove the very fine particles and the washed minus 14 mesh fraction is combined with the plus 14 mesh fraction to constitute the feed to the reducing furnace. This feed is delivered to the stockline of a gravitationally descending column of similar material in a shaft-type reducing furnace, wherein it is treated at a controlled elevated temperature of the order of 800° F., maximum, with a reactive gas mixture comprising about 25% $CO_2$, inert gases mostly nitrogen, and about 8% CO. The manganese content of the ore discharged from the bottom of the column is substantially all in the form of MnO and the iron is in the form of $Fe_3O_4$ only.

About 300 pounds of the reduced ore are added to about 100 gallons of aqueous leaching solution in a closed vessel, said leaching solution containing about 19 mols/liter $NH_3$ and about 3 mols/liter $CO_2$, and the resulting solids-liquid mixture is stirred for upwards from 120 minutes whilst being maintained at a temperature of about 100° F. Thereupon, the solids-liquid mixture is heated at about 55° C. to precipitate manganese carbonate in situ amongst the partially leached ore particles. The resulting mixed solids are separated from associated liquid phase, washed, dried and thereupon heated in air for some hours at about 300° C. The resulting product contains about 70% of $MnO_2$. After the product has been ground to a fineness conventional for battery depolarizer use it is found to exhibit a depolarizing capacity appreciably higher than that of the starting ore ground to like fineness.

The product of the invention is an intimate mixture of chemically produced manganese dioxide and partially leached manganese dioxide ore. The chemically prepared manganese dioxide has a more or less well defined gamma crystal structure.

We claim:

1. Process of improving the depolarizing properties of a high grade manganese ore, which comprises reductively roasting the ore in particulate form so as to convert at least a substantial part of its manganese dioxide content to manganous oxide, treating the ore with a strongly ammoniacal $CO_2$-containing, aqueous solution of an ammonium salt under conditions to promote the formation from such manganous oxide of a pregnant liquor containing an ammonio complex of manganese, effecting precipitation from such pregnant liquor of manganese carbonate in situ in and amongst the particles of at least partially leached ore, separating the liquid phase from the solid phase of the resulting solids-liquid mixture, washing and drying the separated solids, and heating the solids, in air, at a temperature within the range 275°–400° C. to convert the manganese carbonate content of the solids mixture to manganese dioxide.

2. Process as defined in claim 1, in which the treating solution is a strongly ammoniacal solution of ammonium carbamate, and in which the washed and dried solids are heated, in air, at about 300° C. for some hours.

3. As a depolarizer, finely sub-divided particles of manganese dioxide produced by oxidation of manganese carbonate, said particles of manganese dioxide having a gamma crystal structure and being precipitated on carrier particles of at least partially leached manganese dioxide ore.

References Cited in the file of this patent

UNITED STATES PATENTS

| | | |
|---|---|---|
| 1,448,110 | Olaneta | Mar. 13, 1923 |
| 2,655,456 | Gullett | Oct. 13, 1953 |